Patented Mar. 7, 1944

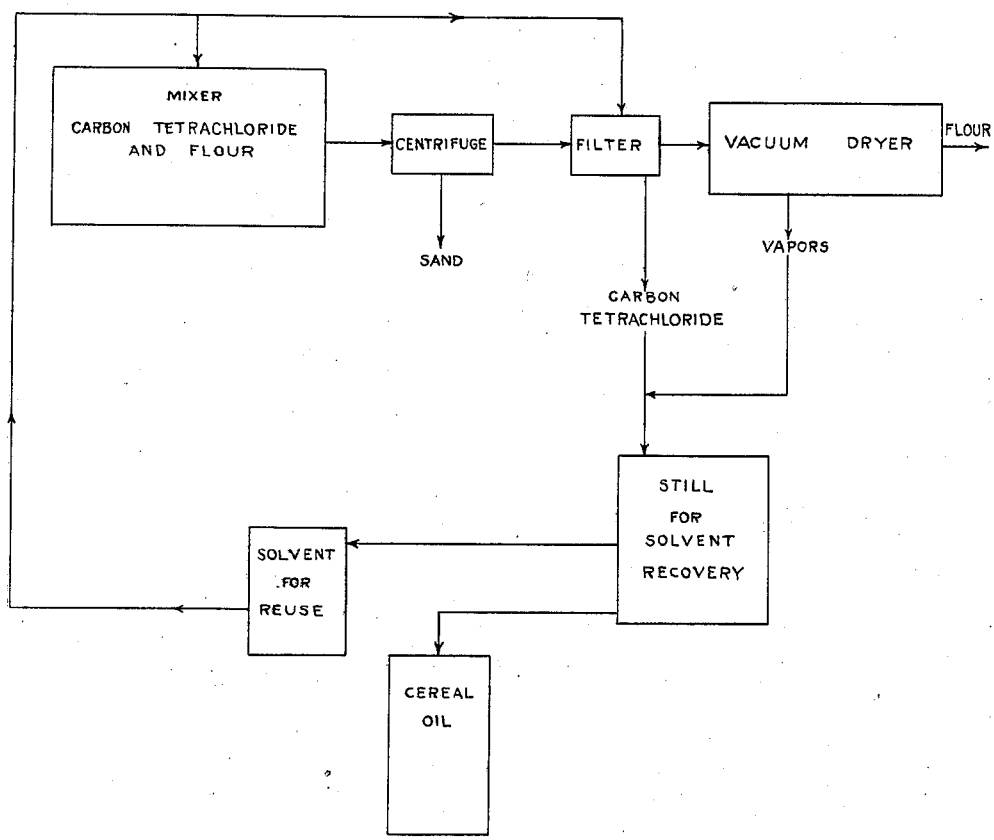

2,343,652

UNITED STATES PATENT OFFICE 2,343,652

TREATING WHEATEN FLOUR

Glenn E. Findley, Dallas, Tex., assignor to Tex-O-Kan Flour Mills Company, Dallas, Tex., a corporation of Delaware Application October 16, 1939, Serial No. 299,740

3 Claims. (Cl. 99—93)

This invention pertains to improvements in treating cereal flour, particularly low grade wheat flour. In commercial parlance such flour now is designated generally by the term "clear."

In present milling practice, cereals are comminuted by passage through a series of rolls. But the products vary at different stages of the rolling process. Flour from the earlier stages is in predominant demand because of superior baking qualities that yield more symmetrical loaves of bread and to some extent more digestible baked goods.

But the rolls at later stages of milling yield the so-called "clear" flour. This comprises as much as 30% of the total flour and often appears dark in color. It exhibits inferior baking characteristics. This "clear" flour tends to inhibit desirable yeast growth, and thus fails to yield as light dough for baking as does higher quality flour. Also, it develops mold and bacterial growth under conditions that do not affect the higher grade flours. This inferior flour, therefore, entails considerable economical loss to growers and to millers.

On investigation, however, it appears that this so-called inferior flour is really of higher nutritive value in many respects than higher priced flour. The "clear" flour is high in protein, often as high as 18%, and also high in mineral content. It also may be manipulated to contain considerable amounts of bran. However, its restraint on the fermentation of dough appears to be due to compounds of complex organic nature that are distributed through this portion of the flour. Certain dissolved lipoids appear to be detrimental to healthy activities of the yeast used to lighten dough.

Moreover, these "clear" flours are high in ash because frequently high in extraneous impurities such as sand and grit. It has been practically impossible to prevent sand and grit from accumulating in the mill tailings or "clear" flour because these impurities have become embedded in the coating of the grain or are forced by the tremendous pressure of milling into the crease of the wheat berry. Fungi also seem to concentrate in this inferior or "clear" flour. Apparently this is because the "clear" flour is produced from that portion of the cereal in proximity to the bran or hull and also from the vicinity of the germ. The higher quality flours, on the other hand, are produced from the more protected and vitreous endosperm in the interior of the berry. It is desirable to purify this inferior flour of such impurities and also from fungus bodies and from detrimental lipoids, and yet preserve the food values.

An object of this invention is to improve the quality of all kinds of lower grade cereal flour. A more particular object is to improve wheaten flour of grades produced from the roll mill tailings generally known as "clear" flour. A further object is to produce "clear" flour of improved keeping and baking qualities and of enhanced food value. A particular object is to improve the baking qualities of lower grade cereal flour by freeing the flour from organic bodies that are detrimental to the development of yeast in dough containing this flour. These and other objects will appear from the following description of the preferred embodiment of this invention shown in the accompanying drawing and pointed out more broadly in the appended claims.

It has been ascertained that certain objects and various advantages of this invention may be attained by treating low grade flour, such as "clear" wheaten flour, according to preferred practice with carbon tetrachloride. Preferably, flour is agitated with a considerable amount of liquid carbon tetrachloride and then removed from impurities that are separated by the tetrachloride.

Reference is made to the accompanying drawing which exhibits a flow sheet of a process which at present constitutes a preferred embodiment of this invention. However, it is to be understood that the invention in its broader aspects may be practiced in other ways and by other means than are specifically shown in the drawing.

The flour to be treated is intermingled with carbon tetrachloride in a tank equipped for agitation. Preferably, the amount of "clear" flour thus intermixed with the tetrachloride is about 20%. The agitator may be of suitable type selected from various commercial forms available. After agitation the magma is drawn through a centrifuge which whirls out grit and sand particles. The flour remains in the tetrachloride as a slurry. This slurry is fed to a filter for separation of the flour particles from the tetrachloride. The filter may be of suitable type selected from commercially available filters. For example, it has been found beneficial to utilize a vacuum drum type rotary filter. Tetrachloride liquid with such water as may be extracted from the flour is led from the filter to a recovery still. The flour is flaked off from the filter as an apparently dry residue.

However, it is exceedingly important to remove all traces of the tetrachloride from the flour.

Hence, the filtered residue is fed to suitable drying equipment. Preferably, this comprises a vacuum type drum dryer. The vacuum assures complete withdrawal of the tetrachloride so that no vapors remain to impair the palatability or the nutritious effect of the flour.

Vapors of tetrachloride are led from the vacuum dryer to the recovery still to be combined with the tetrachloride from the filter previously described. In the still, tetrachloride is vaporized and thus purified. On condensation the recovered tetrachloride is stored to be reused in the process. Such distilled tetrachloride appears to be free from volatile substances that would be deleterious to the flour for food, so that such substances do not accumulate in the recovered tetrachloride. The still contains residues of water and of deleterious lipoidal substances. These may be treated for further separation and purification, if desired. For example, the lipoidal substances may comprise phosphorus compounds that are useful for many purposes.

It is sufficient and, in fact, is preferred procedure to operate this process at atmospheric temperature, that is, at a temperature of about 70° F. Considerable variations will be encountered in the flours to be treated so that accordingly variations will be requisite in conducting the process described. The temperature and the degree of vacuum applied to the dryer and also applied to the recovery still will be adapted by those skilled in the art to known requisite requirements and capacities of the apparatus used.

The flour product that is produced by this process will be improved markedly in color so that instead of an undesirable, dingy, dark color, the flour will be substantially white. It will also be considerably lower in ash than "clear" flour normally is. Of exceeding importance moreover is the fact that the purified flour is substantially free from such components as heretofore have tended to repress the fermentation in dough. Moreover, the flour retains its high quantity and desirable quality of protein or albuminous substances. It retains also the enzymes that act on the flour during subsequent use to digest various flour constituents.

This invention has been illustrated by reference to a treatment of wheaten flour, but it will now be understood by those skilled in the art that various benefits may likewise be accomplished with wheaten flour of all other grades and also with flours and meals other than all wheat. Moreover, preferred practice of this invention has been illustrated with reference to the use of carbon tetrachloride. However, other liquids and combinations of organic chemical liquids may also be of value in some measure in modified practice of this invention. Such liquids will serve to remove or to devitalize the fungi or the enzymes that promote deleterious bacterial growths. In the claims these liquids are termed fungus-repressing liquids. Such material, for example, is chloroform. It is important, however, that the specific gravity of these liquids be sufficiently greater than the cereal products under treatment to permit centrifugal separation of earthy matter, but retain a magma of cereal with the organic liquid.

In accordance with the patent statutes I have pointed out a preferred embodiment and explained the principles of the invention, but would have it understood that various modifications of this invention will now be apparent to those skilled in this art and are included within the scope of the appended claims.

What I claim is:

1. The process of improving comminuted wheaten flour comprising adding thereto chloroform and submitting the mixture to centrifugal action to separate earthy impurities and to form a magma of the chloroform with the comminuted particles.

2. The process of improving comminuted wheaten flour comprising adding thereto carbon tetrachloride and submitting the mixture to centrifugal action to separate earthy impurities and to form a magma of the carbon tetrachloride with the comminuted particles.

3. The process of improving wheaten flour comprising mixing therewith a liquid chlorinated hydrocarbon selected from the following group: chloroform, carbon tetrachloride, and submitting the mixture to centrifugal action to separate earthy impurities and to form a magma of the chlorinated hydrocarbon with the flour particles.

GLENN E. FINDLEY.